(12) United States Patent  (10) Patent No.: US 6,224,528 B1
Bell                       (45) Date of Patent: May 1, 2001

(54) METHOD FOR MAKING BAG CONSTRUCTIONS HAVING INWARDLY DIRECTED SIDE SEAL PORTIONS

(75) Inventor: Gary M. Bell, Crystal, MN (US)

(73) Assignee: Kapak Corporation, St. Louis Park, MN (US)

( * ) Notice: Subject to any disclaimer, the term of this patent is extended or adjusted under 35 U.S.C. 154(b) by 0 days.

(21) Appl. No.: 09/416,224

(22) Filed: Oct. 12, 1999

Related U.S. Application Data

(62) Division of application No. 08/843,156, filed on Apr. 11, 1997, now Pat. No. 5,971,613.

(51) Int. Cl.⁷ ........................................................ B31B 1/64
(52) U.S. Cl. ............................................ 493/196; 493/213
(58) Field of Search ....................................... 493/196, 195, 493/194, 200, 201, 212, 213, 214, 224

(56) References Cited

U.S. PATENT DOCUMENTS

| | | |
|---|---|---|
| 383,327 | 5/1888 | Starr . |
| 1,951,470 | 3/1934 | Cole . |
| 2,001,149 | 5/1935 | Monschein . |
| 2,163,324 | 6/1939 | Reinhold . |
| 2,390,822 | 12/1945 | Wren . |
| 2,442,646 | 6/1948 | Fields . |
| 2,756,154 | 7/1956 | Mahaffy . |
| 2,772,823 | 12/1956 | Plamann . |
| 2,774,402 | 12/1956 | Wikle . |
| 2,865,768 | 12/1958 | Barnes et al. . |
| 2,912,030 | 11/1959 | Fisher . |
| 2,923,404 | 2/1960 | Adell . |
| 2,997,224 | 8/1961 | Stannard . |
| 3,159,096 | 12/1964 | Tucker . |
| 3,174,644 | 3/1965 | Kaltman et al. . |

(List continued on next page.)

FOREIGN PATENT DOCUMENTS

| | | |
|---|---|---|
| 230565 | 12/1963 | (AT) . |
| 22 65 145 | 9/1976 | (DE) . |
| 3031208 A1 | 8/1980 | (DE) . |
| 2933-151 | 2/1981 | (DE) . |
| 3229242 | 2/1984 | (DE) . |
| 0 345 930 A1 | 12/1989 | (EP) . |
| 368145 | 5/1990 | (EP) . |
| 0 537109 A2 | 9/1992 | (EP) . |
| 2632725 | 12/1989 | (FR) . |
| 1 204 462 | 9/1970 | (GB) . |
| 22278338 | 11/1994 | (GB) . |
| 1-111685 | 4/1989 | (JP) . |
| 1-279073 | 11/1989 | (JP) . |
| 2-4651 | 1/1990 | (JP) . |
| 212355 | 2/1990 | (JP) . |
| 3-133747 | 6/1991 | (JP) . |
| 6127552 | 5/1994 | (JP) . |
| WO 94/00363 | 1/1994 | (WO) . |

Primary Examiner—Peter Vo
Assistant Examiner—John Paradiso
(74) Attorney, Agent, or Firm—Merchant & Gould P.C.

(57) ABSTRACT

A bag construction includes first and second opposed panel sections. Each of the panel sections have first and second opposite side edges. The panel sections are secured to one another along at least a portion of the first and second opposite side edges by first and second side seals, to define a bag construction interior. The first and second side seals each have an inner edge portion adjacent to the bag construction interior. The first side seal inner edge portion has at least one non-linear edge section extending over a part of the first side seal inner edge portion. The non-linear edge may include an edge with a plurality of spaced inwardly directed projections, or an edge with curved portions, or an undulated edge. The seals may be used in a variety of packaging arrangements, and help to provide an arrangement which will stand upright when filled or at least partially filled with material.

15 Claims, 8 Drawing Sheets

U.S. PATENT DOCUMENTS

| | | |
|---|---|---|
| 3,229,813 | 1/1966 | Crowe, Jr. et al. . |
| 3,372,625 | 3/1968 | Simecek et al. . |
| 3,434,652 | 3/1969 | Shore . |
| 3,454,211 | 7/1969 | Hoffman . |
| 3,456,867 | 7/1969 | Repko . |
| 3,468,471 | 9/1969 | Linder . |
| 3,469,768 | 9/1969 | Repko . |
| 3,473,589 | 10/1969 | Gotz . |
| 3,503,497 | 3/1970 | Riely et al. . |
| 3,712,848 | 1/1973 | Casey, Jr. et al. . |
| 3,741,778 | 6/1973 | Rowe . |
| 3,807,118 | 4/1974 | Pike . |
| 3,827,341 | 8/1974 | Stage . |
| 3,868,891 | 3/1975 | Parish . |
| 3,935,993 | 2/1976 | Doyen et al. . |
| 3,980,225 | 9/1976 | Kan . |
| 3,991,801 | 11/1976 | Ausnit . |
| 4,000,846 | 1/1977 | Gilbert . |
| 4,085,560 | 4/1978 | McClosky . |
| 4,134,535 | 1/1979 | Barthels et al. . |
| 4,191,230 | 3/1980 | Ausnit . |
| 4,206,870 | 6/1980 | De Vries . |
| 4,358,466 | 11/1982 | Stevenson . |
| 4,526,565 | 7/1985 | Hummel et al. . |
| 4,528,224 | 7/1985 | Ausnit . |
| 4,532,652 | 7/1985 | Herrington . |
| 4,533,425 | 8/1985 | Wehle . |
| 4,553,693 | 11/1985 | Terajima et al. . |
| 4,576,316 | 3/1986 | Foster . |
| 4,601,694 | 7/1986 | Ausnit . |
| 4,640,838 | 2/1987 | Isakson et al. . |
| 4,732,299 | 3/1988 | Hoyt . |
| 4,741,909 | 5/1988 | Guthrie . |
| 4,787,511 | 11/1988 | McIver . |
| 4,818,544 | 4/1989 | Seward . |
| 4,834,247 | 5/1989 | Oshima et al. . |
| 4,837,849 | 6/1989 | Erickson et al. . |
| 4,903,718 | 2/1990 | Sullivan . |
| 4,913,693 | 4/1990 | Ball et al. . |
| 4,972,825 | 11/1990 | Vescovo, Jr. . |
| 5,035,516 | 7/1991 | Pacheco . |
| 5,059,036 | 10/1991 | Richison et al. . |
| 5,080,155 | 1/1992 | Crozier . |
| 5,142,970 | 9/1992 | ErkenBrack . |
| 5,147,272 | 9/1992 | Richison et al. . |
| 5,240,112 | 8/1993 | Newburger . |
| 5,254,073 | 10/1993 | Richison et al. . |
| 5,352,043 | 10/1994 | Takagaki et al. . |
| 5,447,772 * | 9/1995 | Flieger ..................................... 428/99 |
| 5,456,928 | 10/1995 | Hustad et al. . |
| 5,542,902 | 8/1996 | Richison et al. . |
| 5,709,479 | 1/1998 | Bell . |
| 5,971,613 * | 10/1999 | Bell ..................................... 383/107 |

* cited by examiner

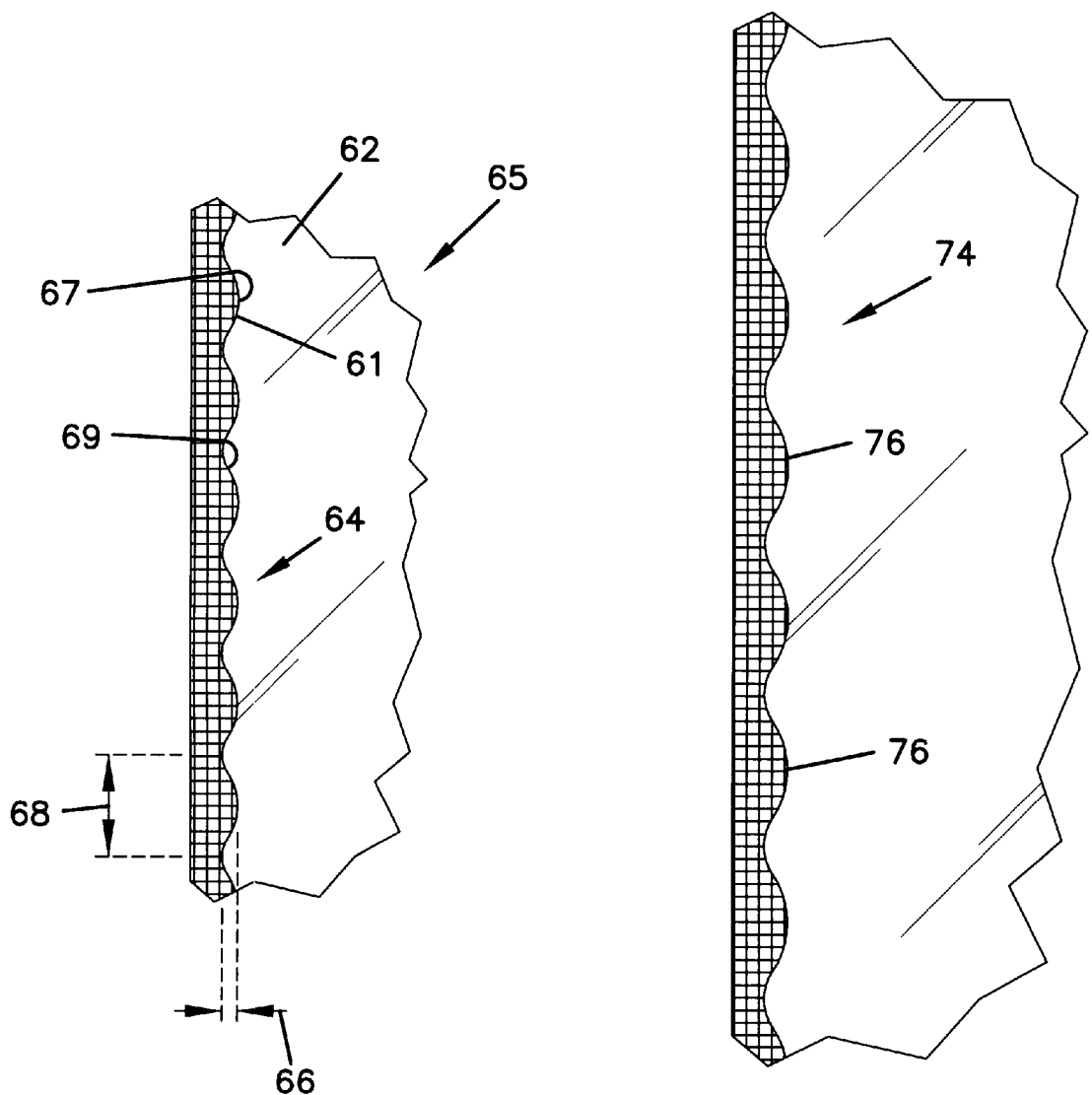

METHOD FOR MAKING BAG CONSTRUCTIONS HAVING INWARDLY DIRECTED SIDE SEAL PORTIONS

This application is a Divisional of application Ser. No. 08/843,156, filed Apr. 11, 1997, now U.S. Pat. No. 5,971,613, which application is incorporated herein by reference.

FIELD OF THE INVENTION

The present invention relates to bag or pouch constructions. In particular, the invention concerns an arrangement in which a bag or pouch construction includes a side seal with a non-linear edge. The invention also concerns methods for preparing and using such arrangements.

BACKGROUND OF THE INVENTION

A variety of items are marketed and enclosed within flexible bags or bag constructions. Examples of such products include shampoo, soap, detergent, lotion, and others. Further, many other products such as nuts, candies, coffee, salt, seed, fertilizer, and the like are also packaged in flexible bags, with or without pour nozzles. The bags may include a reclosable zipper arrangement at one end.

Flexible bags sometimes have a base, such as a bottom gusset or pad, and are arranged to stand upright when filled. This permits the seller to display the bag in a visible and attractive manner. Improvements for maximizing the attractiveness of a flexible bag have been desirable.

SUMMARY OF THE INVENTION

According to the present invention, a bag construction or arrangement is provided. A bag construction includes first and second opposed panel sections. First and second side seals are between the panel sections, and define a bag construction interior. The first and second side seals each have an inner edge portion adjacent to the bag construction interior. The first side seal inner edge portion has at least one non-linear edge section extending over a part of the first side seal inner edge portion.

Preferably, the non-linear edge section extends a distance of at least about 10 cm over the part. In many instances, the non-linear edge section may extend a distance of about 10–61 cm over the part, and in some instances more.

In certain arrangements, the non-linear edge section includes a plurality of spaced inwardly directed projections. The plurality of spaced inwardly directed projections preferably extend a distance of at least 30% of a length the first side edge. Indeed, the plurality of spaced inwardly directed projections may extend over a distance of about 30–100% of a length of the first side edge.

In some embodiments, the non-linear edge section includes at least 4 and preferably at least 13 spaced inwardly directed projections. In certain of the arrangements, each of the projections may be uniform, or of identical size and shape, to one another.

Some arrangements may include the non-linear edge section having a plurality of inwardly directed projections alternating with a plurality of outwardly directed recesses. In one typical embodiment, the non-linear edge section is undulated. The non-linear edge section may be defined by a geometry similar to that of a curve having a height of about 0.5–4 mm.

The non-linear edge section may extend a complete length of the first inner edge portion, in some arrangements.

In certain embodiments, the second side seal inner edge portion has at least one non-linear edge section extending over a portion thereof. The non-linear edge section of the second side seal inner edge portion may also include a plurality of spaced inwardly directed projections.

In some embodiments, a base gusset member is oriented in extension between the first and second panel sections. The base gusset member may include distribution apertures therein. The base gusset member can be a separate section joined to the first and second panel sections; alternatively, the base gusset member can be part of the same section of material as the first and second panel sections.

In preferred arrangements, the first and second panel sections are separate pieces of material joined along the opposite side edges. In other arrangements, the first and second panel sections may be part of the same piece of material, for example, if made by a form-fill-seal process.

In some arrangements, a fitment is secured to the first and second panel sections.

Certain embodiments can include a transverse openable and reclosable closure arrangement extending between the first and second panel sections. This closure arrangement may include a rib and trough closure arrangement.

There is also provided herein a method for constructing a pouch arrangement having first and second opposed panel sections. The method includes a step of providing first and second continuous webs of panel section material. This may include two discrete rolls of panel section material, or it may be from a single roll and then split into two webs. The first and second webs are oriented with respect to one another to form a continuous feed of pouch blank with front and back faces and first and second opposite side edges. The continuous feed of pouch blank is heat sealed by forming a non-linear seal transverse to the first and second side edges to join the front and back faces, and forming a pouch arrangement joined to an adjacent pouch arrangement at the non-linear seal. The pouch blank is then separated into individual ones of pouch arrangements by cutting along the non-linear seal.

Preferably, the step of forming a non-linear seal includes forming a seal having a pair of opposite seal edges. Each of the seal edges has a plurality of spaced projections. This separates the pouch blank into individual pouch arrangements, where each pouch arrangement includes a side seal with a plurality of spaced projections adjacent to, or in communication with, the pouch interior.

In certain preferred methods, the method includes orienting a continuous base gusset between the first and second webs.

In an alternate process, a construction made using a form-fill-seal technique is provided with a non-linear seal.

In another aspect, the invention concerns a seal bar arrangement. The seal bar arrangement includes a rigid bar having a work-engaging surface. The bar is constructed and arranged to conduct and transmit heat through the work-engaging surface. The work-engaging surface includes a flat portion extending at least a partial length of the bar, and first and second side portions intersecting the flat portion. Each of the first and second side portions have an undulated segment and extend at least a partial length of the bar. In one arrangement, the undulated segment of the first and second side portions includes curved projections, each having a height of about 0.5–4 mm and a length of about 12–20 mm. In certain arrangements, the first and second side portions may extend a complete length of the bar. In a typical embodiment, the height is about 2.4 mm, and the length is about 16 mm.

It is to be understood that both the foregoing general description and the following detailed description are exemplary and explanatory only and are not restrictive of the invention, as claimed.

The accompanying drawings, which are incorporated in an constitute a part of the specification, illustrate embodiments of the invention and together with the description, serve to explain the principles of the invention. In the drawings:

BRIEF DESCRIPTION OF THE DRAWINGS

FIG. 5 is an enlarged, fragmented view of a side edge of the embodiments of FIGS. 1–4 showing one seal, according to the present invention;

FIG. 6 is a view similar to FIG. 5, illustrating an alternate embodiment, according to the present invention;

DETAILED DESCRIPTION OF THE PREFERRED EMBODIMENTS

The present invention improves certain prior art bag arrangements by providing a side seal with a non-linear edge. The seal may include an edge with a series, or plurality, of spaced inwardly directed projections. The improved seal improves the attractiveness of bags or pouches by aiding them to stand upright in a straight configuration when at least partially filled with material. One of the problems associated with prior art bag arrangements is that after the bags are at least partially or completely filled and oriented to stand in an upright manner, the side edges of the bag have a tendency to buckle. That is, at least a portion of the upper part of the bag may fold down upon sections lower than it. The present invention uses, in one typical arrangement, side seals with a series of spaced inwardly directed projections, which help the bag, when filled or partially filled with material, to stand upright with a lower propensity for buckling at the sides. While no particular theory with respect to this observation is asserted herein, it may be that the non-linear seals according to the present invention provide shock absorbers for the filled bag. It is noted that a complete absence of any buckling is not a requirement of arrangements described herein.

Figure 1:
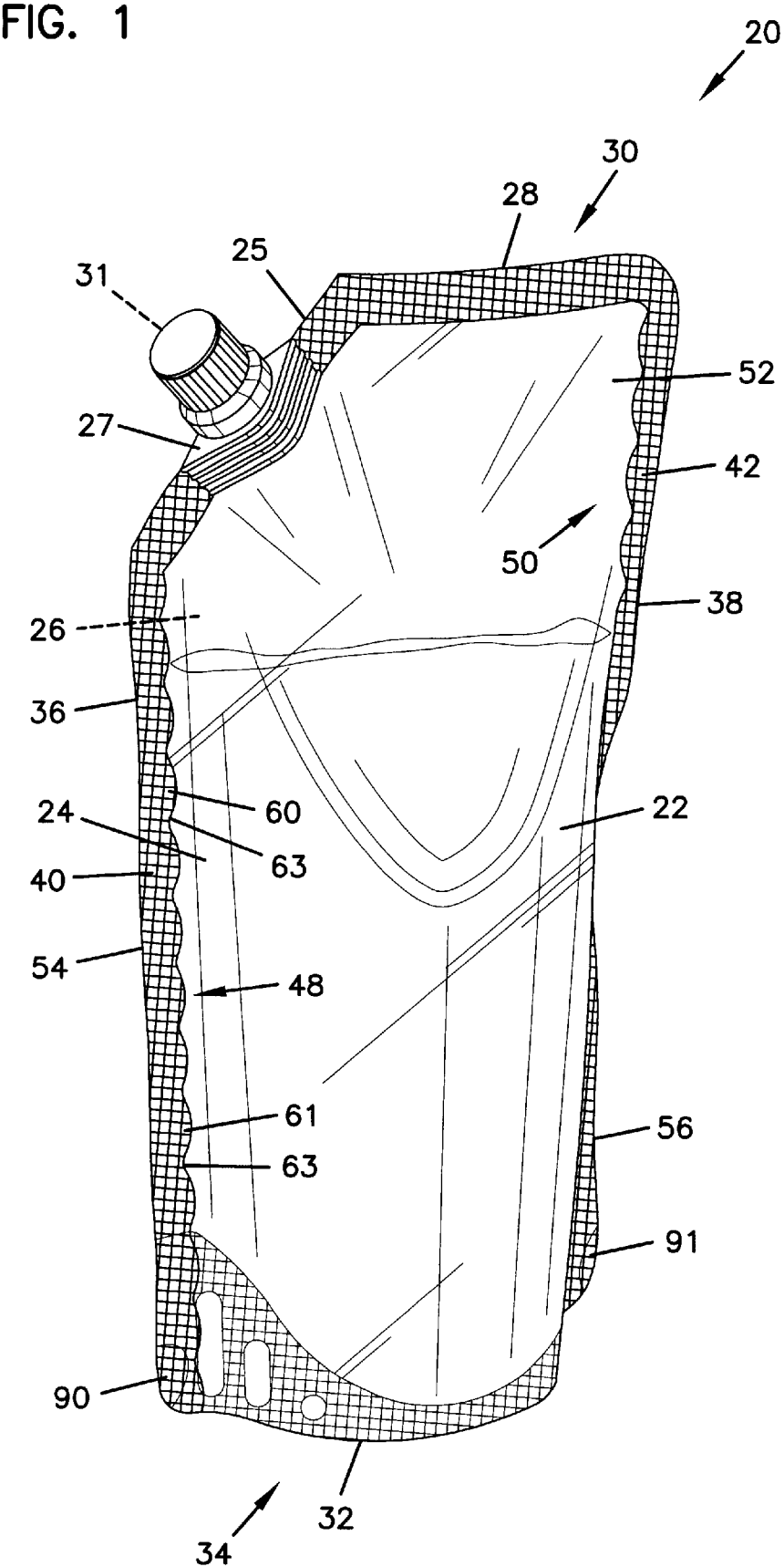
FIG. 1 is a perspective view of a first embodiment of a bag arrangement at least partially filled, according to the present invention.

One example of a bag construction made according to the present invention is illustrated in FIG. 1 generally at 20. The bag construction 20 depicted in FIG. 1 is illustrated as it would generally appear filled or at least partially filled with material 22 for storage therein. Such material may include flowable materials such as liquids, for example, soap, shampoo, lotion; alternatively, such material may include flowable particulates such as coffee beans and grounds, grass seed, fertilizer, candies, salt grains and pellets, and the like.

Still referring to FIG. 1, bag construction 20 includes first and second opposed side walls, panel sections, or panels 24 and 26. Preferably, the first and second panel sections 24, 26 are separate pieces and then joined together. Alternatively, the first and second panel sections 24, 26 may be formed from a single, continuous web material and folded into opposed panel sections. This latter type of arrangement could be constructed in a form-fill-seal machine.

Bag construction 20 is illustrated as being generally rectangular with a slanted portion 25, although other shapes may be utilized. Each of the first and second panel sections 24, 26 includes a first end edge 28 at a first end 30 of the bag construction 20 and a second end edge 32 at a second end 34 of the bag construction 20. Extending between the first and second end edges 28, 32 are opposite side edges 36, 38. In a typical orientation, the bag construction first end 30 corresponds to a top portion, and second end 34 corresponds to a bottom portion. Slanted portion 25 extends between first end edge 28 and side edge 36, at an angle relative to the remainder of side edge 36. A fitment, spout or pour nozzle 27 is secured between the first and second panel sections 24, 26 along the slanted portion 25. Pour nozzle 27 may include a cap 31. In the arrangement shown, cap 31 is threadably secured to the nozzle 27.

As previously explained, each of first and second panel sections 24, 26 includes a second end edge 32 which corresponds to the second end 34 of the overall construction 20. In this portion of the construction 20 (i.e. near edge 32), a base gusset or bottom gusset 39 (FIG. 2) is positioned. Gusset 39 is secured to each of the first and second panel sections 24, 26 by use of appropriate sealing such as heat sealing. Preferably, gusset 39 is a separate piece of web material attached to the first and second panel sections 24, 26. Alternatively, the gusset 39 may be formed from a single, continuous web material as the first and second panel sections 24, 26 and folded into a gusset position with respect to the opposed panel sections. As illustrated in FIG. 1, when the bag construction is filled and expanded, the bottom gusset 39 expands to form a base and to support the construction in a standing or upright position projecting upwardly from the base. The contents of bag construction 20 may be dispensed, as selected, through nozzle 27.

The gusset 39 defines semi-circular portions 90, 91 (FIG. 2) along the first and second edges 36, 38, respectively, adjacent to the second end 34. Semi-circular portions 90, 91 are sections of gusset material removed; i.e. cuts in the gusset 39. This permits the first and second panel sections 24, 26 to be heat sealed directly to one another in this location, during the manufacturing process. At other areas 92, 93 along the edges of the gusset 39 not within semi-circular portions 90, 91, the gusset 39 is sealed to the panel sections, and the panel sections are not sealed to one another because the gusset is positioned between them.

First and second panel sections 24, 26 are secured to one another along portions of side edges 36, 38. Preferably, this is by use of seals 40, 42. For one arrangement illustrated in FIGS. 1 and 2, seals 40, 42 extend along side edges 36, 38, respectively, between first end 30 and points 44, 46 where the gusset 39 intersects the side edges 36, 38. Further, at the region of semi-circular portions 90, 91, the first and second panel sections 24, 26 are sealed to one another.

Each of first and second seals 40, 42 have an inner edge portion 48, 50, respectively, adjacent to, or in communication with, the bag construction interior 52. Each of the first and second seals 40, 42 also include an opposite outer edge portion 54, 56, respectively. Preferably, the first and second seals 40, 42 include a non-linear configuration 58 along the inner edge portions 48, 50. The term "non-linear configuration" and variants thereof means an edge which is not linear, or straight, along the entire surface of the edge 48, 50, for example from the first end 30 down to points 44, 46 where the seals 40, 42 intersect the ends 44, 46, respectively, of the gusset region. That is, a "non-linear configuration" may include at least some portions along the inner edges 48, 50 which are linear, or straight. For example, at least some portions along the side seals of the bag construction may be curved or include other geometrical shapes (with or without some straight portions), but the edge is not straight along the entire continuous inner edge surface 48, 50 of the seal. It has been found that when the first and second inner edges 48, 50 are constructed with non-linear edges 58, certain advantages result. For example, a bag or pouch construction including one or more side seals with at least partial sections having non-linear edges as described can exhibit less tendency to buckle at the sides along the seals when filled or partially filled with material and oriented in an upright position.

Figure 2:
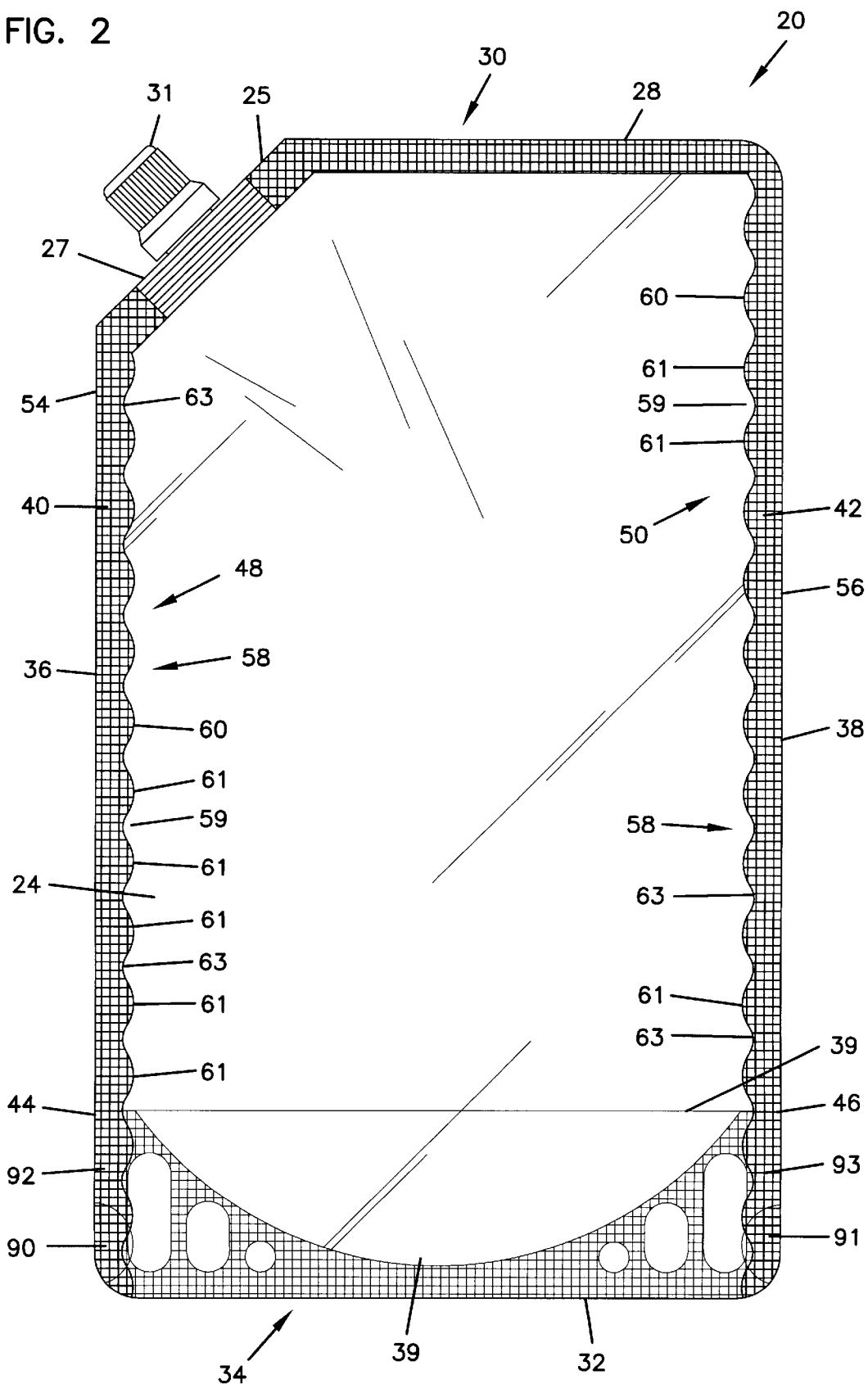
FIG. 2 is a plan view of the bag arrangement shown in FIG. 1, devoid of any contents and in a collapsed orientation.
Figure 3:
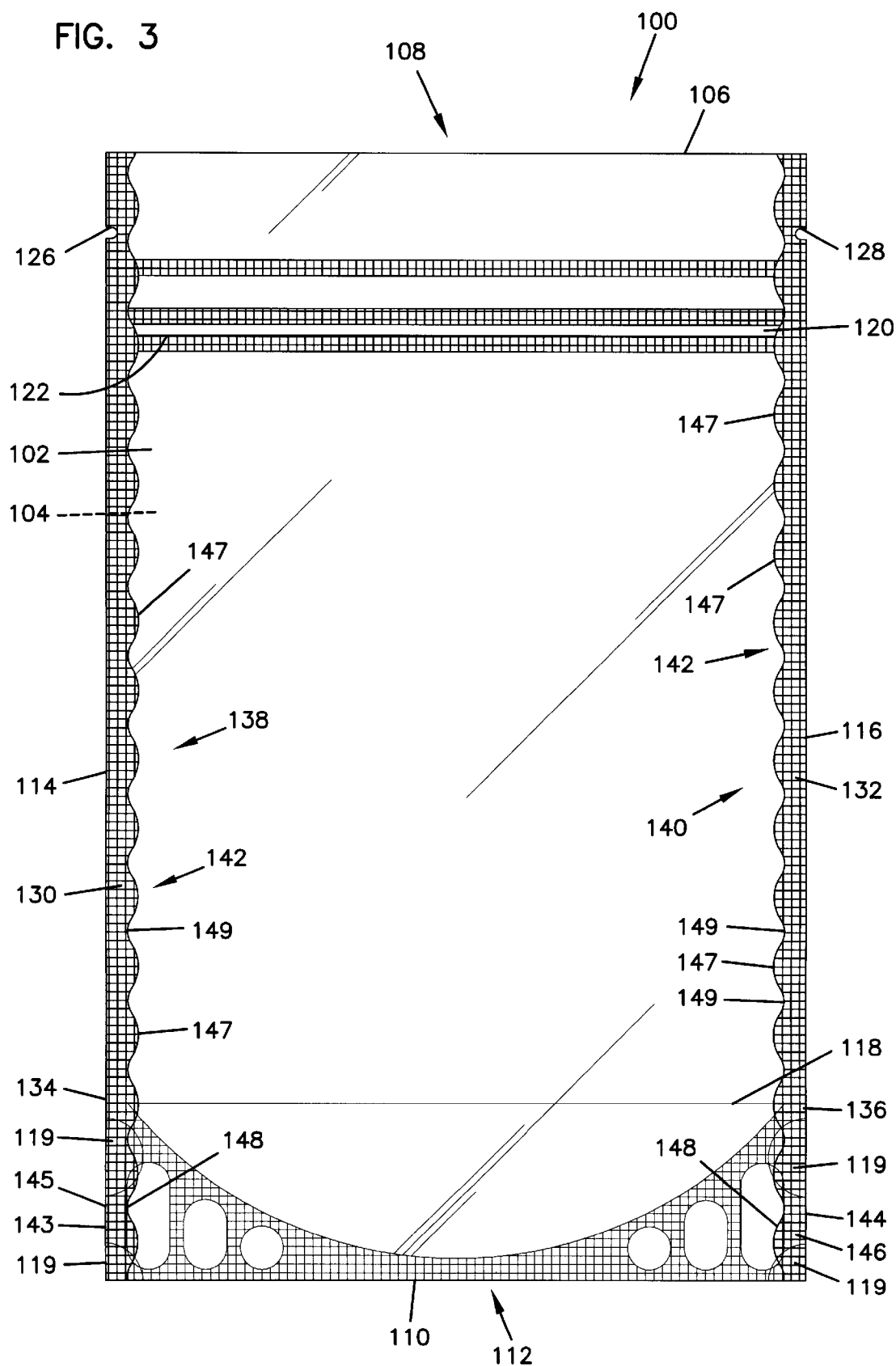
FIG. 3 is a plan view of a second embodiment of a bag arrangement according to the present invention.

One typical, useable, non-linear edge configuration includes an edge with a series, or plurality, of spaced inwardly directed projections. An example of one such edge is illustrated in FIGS. 1–3 at 60. Edge 60 includes a series, or plurality, of inwardly directed projections 61, spaced apart from each other at spaces 59. In the specific embodiment illustrated, inwardly directed projections 61 point toward the bag interior 52. Inwardly directed projections 61 may extend completely along each of side seals 36, 38 at their inner edge portions 48, 50. This may include from the first end edges 28 to the points 44, 46 where the seals 40, 42 intersect the ends of the gusset region. Further, inwardly directed projections 61 may extend completely along the length of the side edges 36, 38. This would include from the first end edges 28, through the points 44, 46 where the seals 40, 42 intersect the ends of the gusset region, through the areas 92, 93 of the gusset region (where the gusset is sealed to the panel sections), through the semi-circular portions 90, 91, and to the second end edges 32.

Alternatively, inwardly directed projections 61 may extend only a partial length along inner edges 48, 50. For example, inwardly directed projections 61 may extend only in a portion of the middle section of the side edges 36, 38, to cover at least about 30% of the total length of one of the side edges 36, 38, from first end edge 28 to second end edge 32. In other arrangements, at least about 50% of the total length of one of the side edges is used. Many arrangements will use at least 60% up to 100% of the total length of one of the side edges. The length of extension of the non-linear edge portion may depend upon factors such as the product to be held in the bag, the density of the product, the amount of the product in the bag, the structural materials of the panel sections, and the overall size and relative dimensions of the bag construction.

Typically, inwardly directed projections 61 are along both of the first and second inner edge portions 48, 50 and along the complete length of first and second seals 40, 42. The seal 40 will typically have a mirror image appearance to seal 42, but such is not required.

In the illustrated arrangements, each of the inwardly directed projections 61 are of identical size and shape. However, it is contemplated that each of the inwardly directed projections 61 could vary between each other in size and shape. Inwardly directed projections 61 on edge 60 may include straight, or linear, portions. It may, for example, resemble a series of square shapes, rectangular shapes, triangular shapes, zigzag shapes, sawtooth shapes, or combinations of these or other shapes.

Edge 60 may also include a series of outwardly directed recesses 63, spaced apart from each other. Outwardly directed recesses 63, in the illustrated embodiments, are directed from the bag interior 52 and toward the outer edge of the seals 40, 42. Each of the outwardly directed recesses 63, in the illustrated embodiments, alternate with each of the inwardly directed projections 61. Although each of the outwardly directed recesses 63 are shown as being of identical size and shape, the outwardly directed recesses 63 may vary between each other in size and shape.

Inwardly directed projections 61 and outwardly directed recesses 63 may include rounded portions or curves. An example of one such distinctive appearing edge with curves is illustrated in the FIG. 5 generally at 65. FIG. 5 illustrates an enlarged view of one of the first and second seals 40, 42, and in particular, the inner edge 62. Inner edge 62 defines one typical shape for the non-linear edge. In the example illustrated, each of the inwardly directed projections 61 includes a curved, or rounded portion 67 having a radius of curvature of about 5–10 mm, and preferably about 7–9 mm. In one arrangement, the rounded portion at the tip of the inwardly directed projections has a radius of curvature of about 8.75 mm, and in another, about 7.5 mm. Also, in the example illustrated, each of the outwardly directed recesses 63 includes a rounded portion 69 having a radius of curvature of about 2–10 mm, and preferably about 5–8 mm. In one embodiment, the rounded portion of the outwardly directed recess has a radius of curvature of about 6–7 mm, in particular, 6.8 mm.

In some arrangements, inner edge 62 may have a series of uniform curved shapes, such as an undulated edge 64. The undulated edge may resemble a wave pattern. The curve may vary in height and length, based upon the desired application and packaging materials used. As used herein, the term "height" means the distance from the farthest extension of the projection to the deepest point of the adjacent recess, as shown in FIG. 5 at 66. The term "length" means the distance from the deepest point of one recess to the deepest point of the adjacent recess, as shown in FIG. 5 at 68. In the inner edge 62 shown, the curve includes a height 66 ranging from about 0.5–4 mm, preferably about 1.5–2.5 mm. Certain curves 64 include heights of about 1–2 mm, and others about 2–3 mm, preferably about 2.4 mm. The inner edge 62 shown includes a length 68 of each curved projection ranging from about 12–20 mm, preferably about 13–17 mm. Certain curves used include lengths of about 13 mm, others about 16 mm, and others about 16.6 mm.

The particular seal arrangement of FIG. 5 is desired, at least in part, because it provides an attractive and eye-catching appearance, when used with the arrangements of FIGS. 1–4, either when flat and devoid of material, or when filled or at least partially filled with material.

Another embodiment of a non-linear edge for the first and second seals 40, 42 is illustrated in FIG. 6. In this embodiment, an inner edge 74 includes a series of smooth projections 76. Inner edge 74 defines projections 76 with a greater height and smaller length than the inner edge 62 of FIG. 5.

Figure 7:
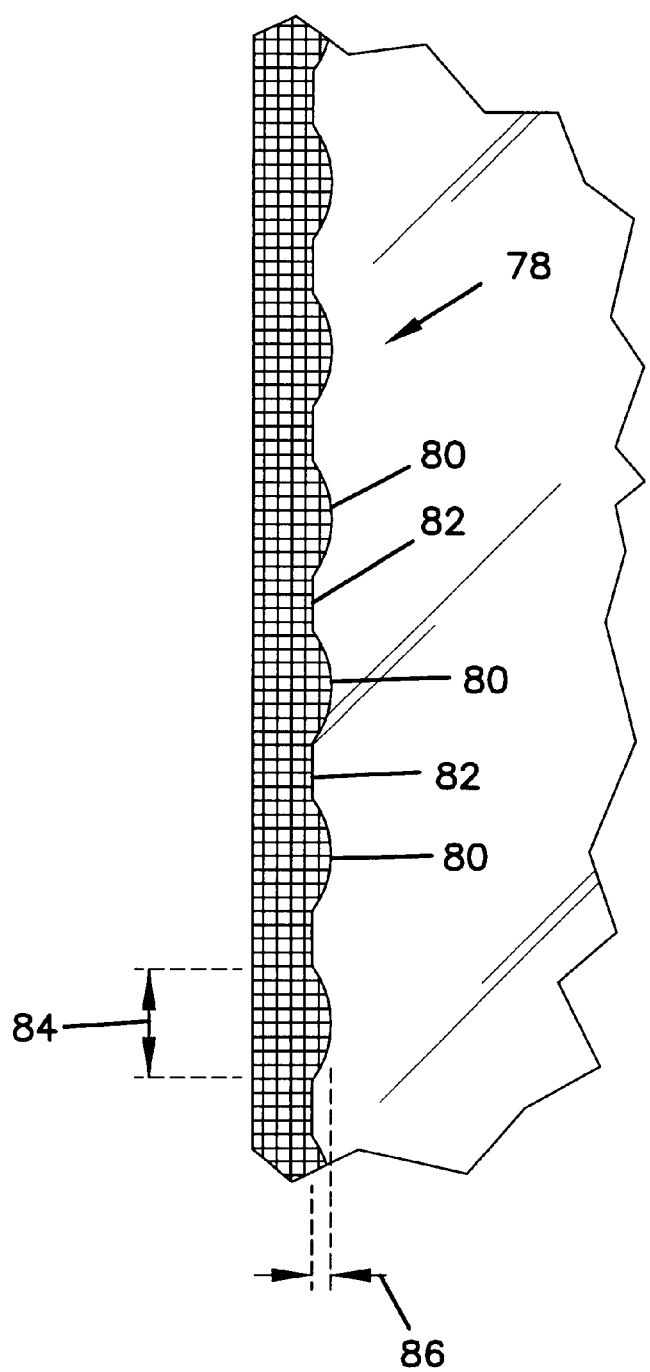
FIG. 7 is a view similar to FIG. 5, illustrating another alternative embodiment, according to the present invention.

FIG. 7 illustrates another embodiment of a non-linear edge for the seals 40, 42. In this embodiment, an inner edge 78 defines a series of spaced inwardly directed projections 80 joined (spaced) by straight edges 82. Projections 80 resemble bumps and are illustrated as D-shaped. A length 84 of each projection 80 may range from about 10–20 mm and include a height 86 of about 0.5–5 mm. "Height" in this embodiment is the distance between one of the straight edges 82 and the furthest extension of an adjacent projection 80, as shown at 86. "Length" in this embodiment is the distance between where one end of the projection intersects the straight edge 82 to where the projection's opposite end intersects the straight edge 82, as illustrated at 84 in FIG. 7. Other sizes of projections 80 may be used.

Other configurations for the non-linear edge for the seals 40, 42 are contemplated, depending upon the particular application and desires.

In an alternative embodiment, the bag construction 20 of FIG. 1 does not include a pour spout or nozzle 27 sealed to the panel sections. Rather, the bag construction is completely sealed with its contents in the bag interior.

Another example of a bag or pouch construction according to the invention is illustrated in FIG. 3 at 100. Pouch construction 100 includes first and second opposed panel sections 102 and 104. Pouch construction 100 is illustrated as being rectangular, although other shapes may be utilized. Each of the first and second panel sections 102, 104 include a first end edge 106 at a first end 108 of the pouch construction 100 and a second end edge 110 at a second end 112 of the pouch construction 100. Extending between the first and second end edges 106, 110 are opposite side edges 114, 116. A gusset 118 is secured to each of the first and second panel sections 102, 104 by appropriate techniques, such as heat sealing. Semi-circular portions 119, defined by gusset 118, are sections of gusset material removed. This permits the first and second panel sections 102, 104 to heat seal to one another, in the manufacturing process. When the pouch construction is filled and expanded, the bottom gusset 118 expands to form a base and support the construction in a standing or upright position. In a typical orientation, the pouch construction first end 108 corresponds to a top portion, and second end 112 corresponds to a bottom portion.

Pouch construction 100 includes a closure arrangement 120 adapted for selective opening and closing of the construction for access to the pouch construction interior. Preferably, the closure arrangement 120 includes a rib and trough, or a zipper, closure arrangement 122 secured to interior surfaces of the first and second panel sections 102, 104. The closure arrangement may be mounted adjacent to the first end 108 near the first end edges 106. An end seal may seal the first and second panel sections 102, 104 to each other between the closure arrangement 120 and first end edges 106. First and second tear notches 126, 128 may be respectively oriented along the opposite side edges 114, 116 of the first and second panel sections 102, 104 to facilitate tearing open the end seal.

Pouch construction 100 may include a vent arrangement on one of the panel sections. Specifically, a vent arrangement may include a pore covered by a gas permeable filter arrangement comprising a filter member. Of course, this means either a valve member or filter member covering the pore either on the exterior or interior of the pouch construction. The pore, of course, may be a vent, slit, or circular hole. Such an arrangement may be advantageous for packaging products which release gasses, such as coffee beans. One such arrangement is described in U.S. Pat. No. 5,059,036 to Richison et al., hereby incorporated by reference.

First and second panel sections 102, 104 are secured to one another along portions of side edges 114, 116 preferably by means of seals 130, 132. Seals 130, 132 extend along side edges 114, 116, respectively, between first end 108 and points 134, 136, where the gusset 118 intersects the side edges 114, 116.

Each of first and second seals 130, 132 have an inner edge portion 138, 140 preferably including a non-linear configuration 142 along the inner edge portions 138, 140. Inner edge portions 138, 140 may include a plurality of spaced inwardly directed projections 147 or a plurality of spaced outwardly directed recesses 149, such as those illustrated in FIGS. 5–7. Further, inner edge portions 138, 140 may include a series of curved projections, or it may include undulations. Other edge shapes may also be used. When pouch construction 100 is filled or partially filled with material, the non-linear edges in pouch construction 100 reduce the tendency of the side edges 114, 116 from buckling or bending over itself, allowing the pouch construction to stand tall, forming about a straight line along side edges 114, 116.

As in the embodiment of FIGS. 1 and 2, gusset edges 143, 144 are secured to each other with seal portions 145, 146. Seal portions 145, 146 may also include non-linear inner edge portions 148, as described herein.

Figure 4:
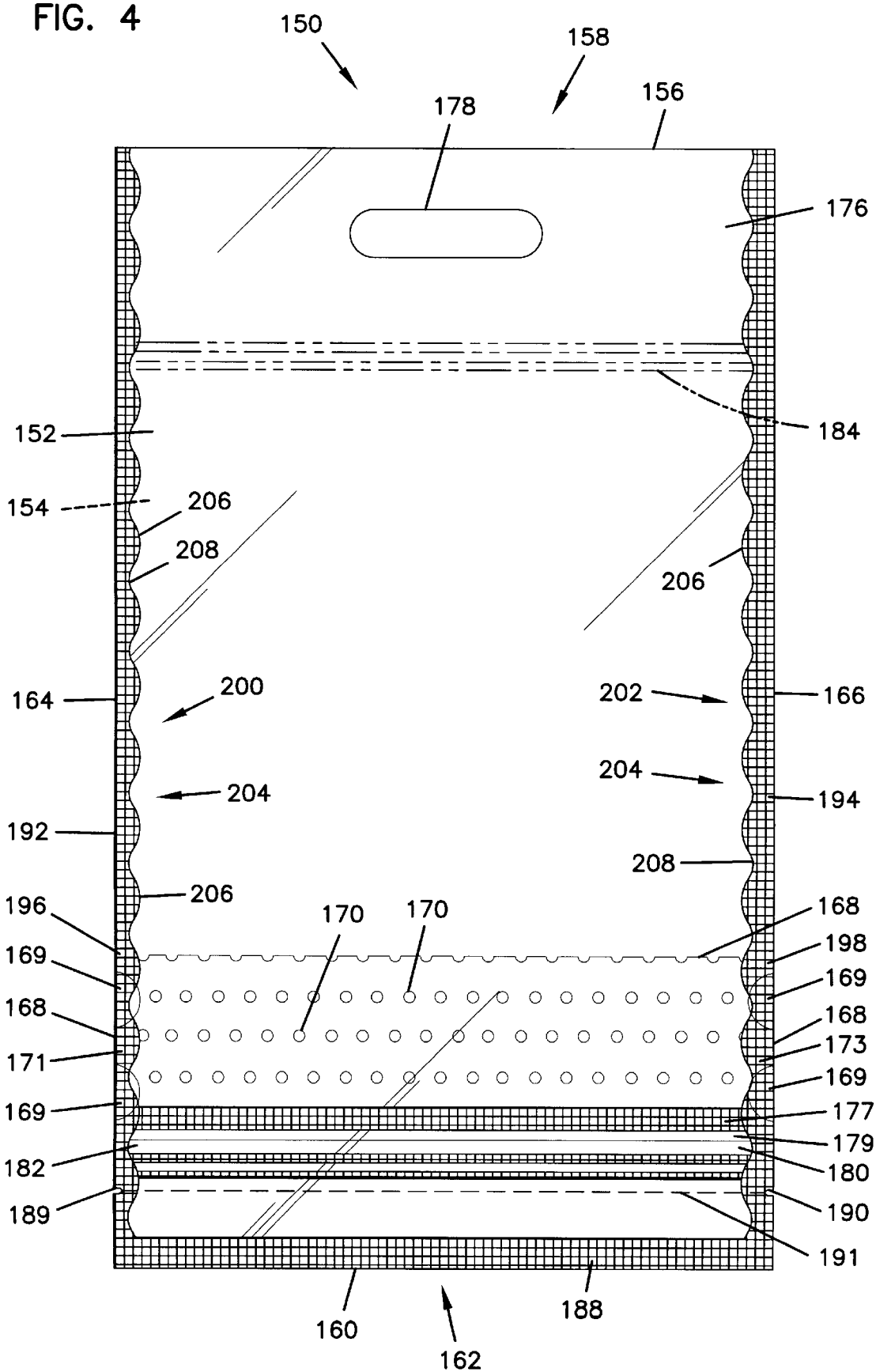
FIG. 4 is a plan view of a third embodiment of a bag arrangement according to the present invention.

Another example of a bag arrangement according to the invention is illustrated in FIG. 4 at 150. Bag arrangement 150 includes first and second opposed panel sections 152 and 154. Each of the first and second panel sections 152, 154 include a first end edge 156 at a first end 158 of the bag arrangement 150 and a second end edge 160 at a second end 162 of the bag arrangement 150. Extending between the first and second end edges 156, 160 are opposite side edges 164, 166. A gusset 168 is secured to each of the first and second panel sections 152, 154 by appropriate techniques such as heat sealing. A seal 177 secures gusset 168 to interior regions of the first and second panel sections 152, 154. Seal 177 extends transversely from edge 164 to edge 166. A portion 179 of gusset 168 extends below seal 177. Semi-circular portions 169 are defined by the gusset 168, and are sections of gusset material removed. This permits the first and second panel sections 152, 154 to heat seal to one another, in the manufacturing process. At other areas 171, 173 along the edges of the gusset 168 not within circular portions 169, the gusset 168 is sealed to the panel sections, and the panel sections are not sealed to one another. Gusset 168 is perforated, as illustrated, by distribution apertures or holes 170. In one embodiment, round apertures of about 0.1865 inch in diameter are used. The average population of such apertures is about 8 per square inch.

Bag arrangement 150, as oriented and depicted in FIG. 4, has a first closed (top) end 158 and a second, opposite open (bottom) end 162. In the particular embodiment shown, closed end 158 includes an upper flap 176 with a handle aperture 178 therein.

Bag arrangement 150 may include a closure arrangement 180 for selective opening and reclosing of end 162. For the particular arrangement illustrated, closure arrangement 180 includes a zipper or rib and trough closure arrangement 182. Bag arrangement 150 may also include a closure arrangement 184, such as a rib and trough closure 186 for selective opening and reclosing of top end 158. Preferably, bag arrangement 150 includes only a single closure arrangement at either the first end 158 or at second end 162. However, some arrangements may include closure arrangements at both ends.

A seal 188 may seal the first and second panel sections 152, 154 to each other to close the second end 162. First and second tear notches 189, 190 may be respectively oriented along the opposite side edges 164, 166 of the first and second panel sections 152, 154 to facilitate tearing open the seal 188 along a tear perforation 191.

A typical use for arrangement 150 includes distributing flowable material. For example, in use, the user holds construction 150 by the handle 178. With bottom end 162 open, if the user shakes the bag arrangement 150, flowable particulate material (for example, pellets, grains, or powders) within bag arrangement 150 will be dispensed through bottom gusset 168, i.e. through apertures 170, and will be distributed out of the open end 162.

First and second panel sections 152, 154 are secured to one another along portions of side edges 164, 166 preferably by means of seals 192, 194. Seals 192, 194 extend along side edges 164, 166, respectively, between first end 158 and points 196, 198, where the gusset 168 intersects with the first and second panel sections 152, 154.

Each of first and second seals 192, 194 have an inner edge portion 200, 202 preferably including a non-linear configuration 204 along the inner edge portions 200, 202. Inner edge portions 200, 202 may include a plurality of spaced inwardly directed projections 206 or a plurality of spaced outwardly directed recesses 208, such as those illustrated in FIGS. 5–7. Further, inner edge portions 200, 202 may include other edge shapes. When bag arrangement 150 is filled or partially filled with material, the non-linear edges in bag arrangement 150 reduces the tendency of the side edges 164, 166 from buckling or doubling over, often resulting in about a straight line along side edges 164, 166.

Figure 8:
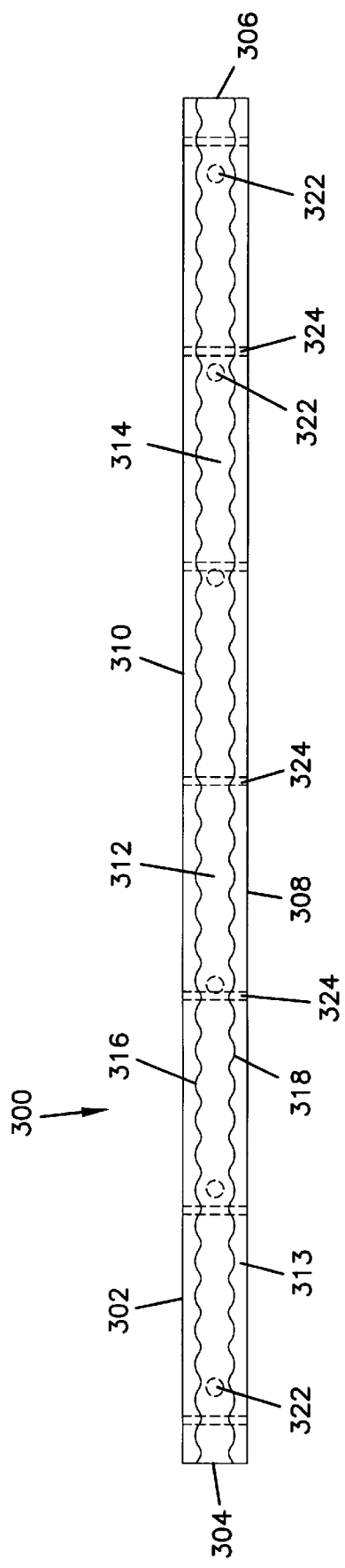
FIG. 8 is a top plan view of one embodiment of a seal bar, according to the present invention.
Figure 9:
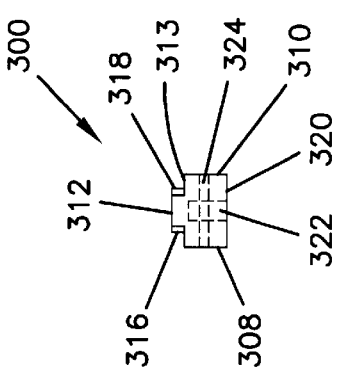
FIG. 9 is an end view of the seal bar shown in FIG. 8, according to the present invention.

In accordance with the invention, a seal bar arrangement for making the seals with non-linear, and in particular, edges with a series of spaced inwardly directed projections is provided. One example of a seal bar arrangement is illustrated in FIGS. 8 and 9 generally at 300. Seal bar arrangement 300 includes a rigid bar 302, illustrated as an elongated member, having a rectangular perimeter in plan view. Bar 302 includes a first end 304, an opposite longitudinal end 306, a first side 308 and an opposite side 310. Seal bar 302 includes a work-engaging surface 312 which may extend partially or completely between first and second ends 304, 306. Work-engaging surface extends from, or is plateaued from a shelf 313 of bar 302. Seal bar 302 is constructed and arranged for conducting heat and transmitting heat from work-engaging surface 312 onto the work, i.e. opposed panel sections for heat sealing. Seal bar 302 is heated in conventional manners within the knowledge of one skilled in the art.

Work-engaging surface 312 includes a planar, flat portion 314. Intersecting flat portion 314 are first and second side edges 316, 318, which also extend from and intersect shelf 313 of bar 302. First and second side edges 316, 318 form the edges of work-engaging surface 312.

First and second side edges 316, 318 have the configuration of the desired resulting non-linear edge of the inner edge portions of the seals in the bag constructions and arrangements described herein. For example, in the particular seal bar arrangement 300 illustrated, the side edges 316, 318 have a series of spaced inwardly directed projections. More particularly, the side edges 316, 318 have curved rounded surfaces. Specifically, the side edges resemble an undulated configuration. To result in the seal configuration illustrated in FIG. 5, for example, at least one of the side edges 316 or 318 in the seal bar arrangement 300 should have a height and length of each rounded projection the same as the FIG. 5 illustration. One typical height is about 2.4 mm, and length is about 16 mm.

Seal bar arrangement 300 includes an opposite surface 320 on an opposite side from work-engaging surface 312. Surface 320 defines a series of cylindrical apertures 322 in partial extension through bar 302. Apertures 322 are for accommodating lug nuts in the sealing station. A second series of cylindrical apertures 324 extend transverse to apertures 322 and form through-holes from first side 308 to second side 310. Apertures 324 are for accommodating bolts for holding a brass rail along the sides 308, 310. A glass cloth with a pattern may be held by the brass rail across the work-engaging surface 312. The glass cloth provides a pattern in the resulting seal, to help visually distinguish the seal from the rest of the bag construction. One glass cloth which may be used is a polytetrafluoroethylene coated glass fiber fabric, with a 5.8 mil thickness, available from Chukou Kasei Kogyo Co., Ltd., Osaka, Japan.

In use, seal bar arrangement 300 is used to heat seal opposing webs of bag constructions and arrangements. The work-engaging surface 312 is pressed upon the layered webs by placing the flat, planar surface 314 on the top web. Heat is transmitted from the seal bar 302 to the webs. The webs melt along the portion of contact (i.e., the flat portion 314 as bordered by the first and second side edges 308, 310), and then fuse to one another along the portion of contact upon cooling. This results in opposed webs sealed together along a central line bordered by opposite non-linear seal surfaces (i.e., a mirror image of the work-engaging surface 312 of the seal bar arrangement 300). To form individual bags or pouches, the webs sealed together are cut apart at the seal along a line between the opposite non-linear seal surfaces.

While a variety of processes may be utilized to prepare arrangements according to FIGS. 1–4, herein preferred, convenient methods are described. A schematic representing steps of the method is illustrated in FIG. 10.

Figure 10:
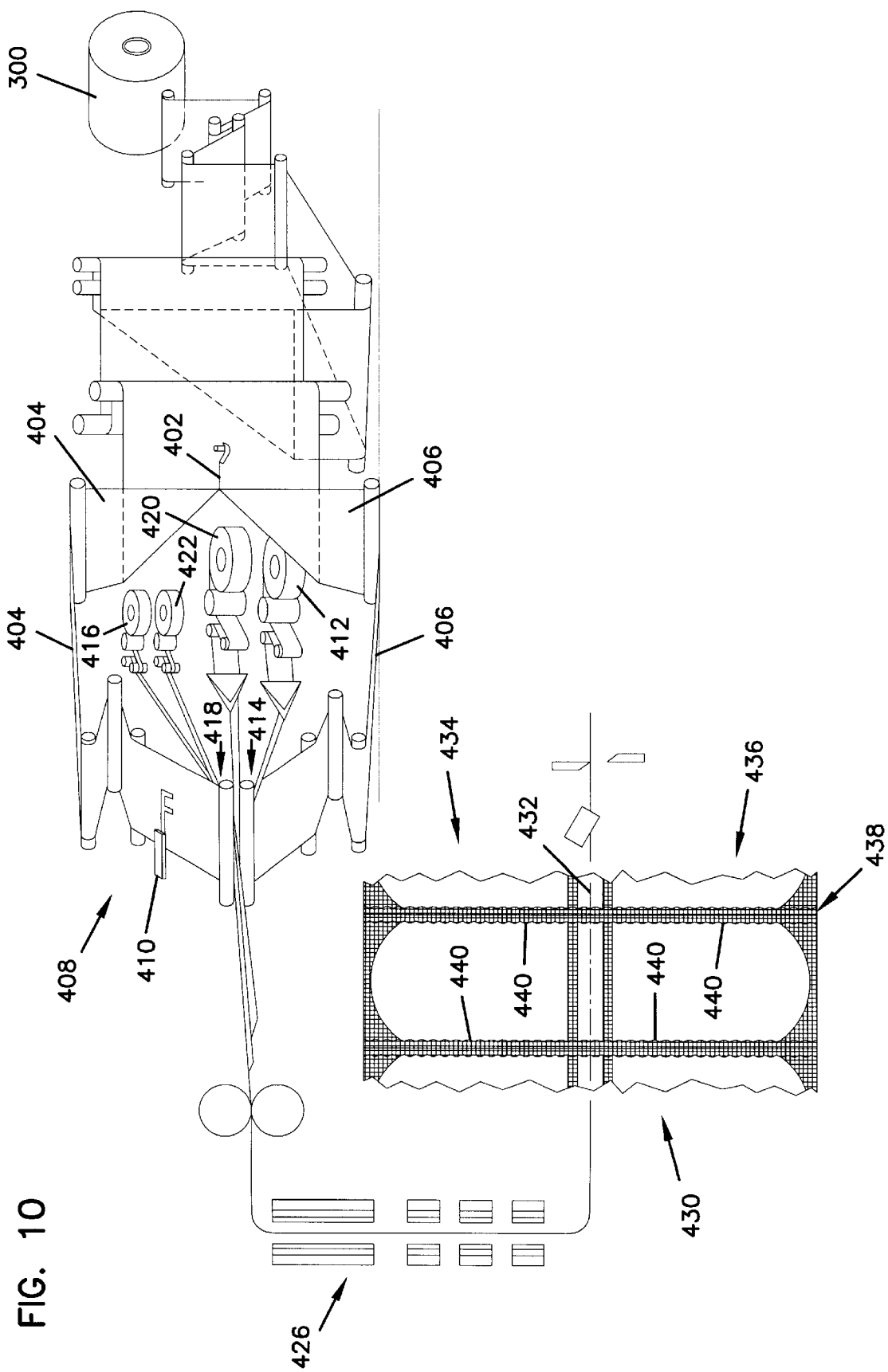
FIG. 10 is a schematic representation of certain of the steps for conducting a method according to the present invention.

FIG. 10 illustrates in particular a schematic for making the pouch arrangement shown in FIG. 3. In particular, the schematic of FIG. 10 shows the manufacture of pouch arrangements including a pore punched in one of the panel sections of the pouch for fitting of a filter or valve member thereover. Such a method is described in U.S. Pat. No. 5,059,036 to Richison et al., incorporated herein by reference. Referring to FIG. 10, a single web of material 300 is shown split in half, longitudinally at line 402 to form first and second half webs 404 and 406. Instead of using a single web split in half, two separate webs may also be used, depending upon the desired resulting size of the pouch arrangement. Further, if there is printing or graphics on the web material which should be aligned in opposed panel sections, it is preferred to use a single roll of material with the graphics already aligned and then split in half, as illustrated in FIG. 10.

The webs are shown fed toward a station 408 where they are positioned in opposition to one another. If forming a pouch arrangement including a pore, one of the webs 404 is pierced or ruptured, to form the pore which may eventually be used as a vent arrangement in a bag formed therefrom. The pore may be a slit or a circular hole, for example. In FIG. 10, a step of forming the pore is illustrated at station 410. Of course, the pore could be formed after the steps of sealing, separating into individual pouch arrangements, and trimming are performed.

The system shown in FIG. 10 is depicted operated in a manner such that the webs 404 and 406 are brought together to form two transversely positioned pouches, in a head-to-head fashion, at the same time. That is, the pouches are formed adjoined to one another at the first end region 108, FIG. 3, and during a later cutting and trimming process, they are cut apart. Depending on the desired resulting pouch size, the pouches may not be made in a head-to-head fashion. Rather, they may just be made side-to-side.

At station 408, where webs 404 and 406 are directed toward one another for ultimate formation of the pouches, a continuous web 412 of base gusset material is shown fed in at 414. A continuous strip 416 of rib and trough closure material is shown fed in at point 418. Rib and trough material typically is fed in a form which it is already pressed together in an interlocking manner. Rib and trough closure 418 may be split into its respective mating pieces (the rib and the trough), and separately heat sealed to each respective web sections. Alternatively, rib and trough closure 418 may not need to be separated from their interlock, but heat sealed directly to the two webs. At station 408, webs 404, 406, gusset web 412, and rib and trough closure material 416 are all oriented, for formation of a pouch arrangement such as arrangement 100, FIG. 3.

As previously mentioned, at station 408, two longitudinally spaced pouches are formed. Thus, the composite formed at station 408 comprises a continuous web having a centered longitudinal line dividing it into a first and second half, each half comprising the structures of pouches according to the present invention. Thus, at station 408 a second web 420 of gusset material is fed into the arrangement; and, a second web 422 of rib and trough closure material is also fed into station 408.

At 426, the continuous web composite 424 passes through heat sealing arrangements 428 to provide the appropriate heat seals. The rib and trough closure 418 is heat sealed to the web sections. A seal across the bottom or second end 112 of the pouch arrangement, FIG. 3, is first applied with an appropriate heat seal bar. If made in a head-to-head fashion, both of the pouches in the continuous web are heat sealed across the second or bottom ends. Cooling bars can be used to quench the seal.

The side seals are then applied. Heating bars, for example those made according to those described in FIGS. 8 and 9, can be used to apply the side seals. The general appearance of the web as it leaves the heat sealing station will be understood by reference to construction 430, which shows the web construction from a top plan view. Web construction 430 shows a construction which is eventually separated into two individual pouch arrangements. Eventually, it will be cut along center line 432 into first and second opposite halves 434 and 436. Web construction 430 is also cut along center line 438 to divide web construction 430 into individual pouch constructions. Center line 438 is along the seal region, and about halfway between the non-linear edges of the seal 440. This results in individual pouch constructions having straight outer edges of the side seals and inner edges with a series of curved or rounded projections.

If constructing a pouch arrangement with a valve or filter arrangement, the valve or filter element may be positioned over the pore (that is, either on an outside surface of the bag or within the bag interior) by a variety of means. For example, a valve or filter may be positioned at separate station by adhering a valve to the exterior of the bag. Alternatively, a valve may be positioned by heat sealing in circumscription around the pore in the bag interior just after making the aperture or pore (that is, after the step of forming individual pouch constructions). The pore and valve may also be positioned just after unwinding the web section material and prior to the heat sealing of the rib and trough closure or the edges.

A process for manufacturing a pouch arrangement as illustrated in FIGS. 1 and 2 may be similar to that illustrated in FIG. 10. Of course, if the arrangement of FIGS. 1 and 2 is not to include a rib and trough closure, the step of applying rib and trough closure is omitted. After the step of cutting into individual pouch arrangements, a corner of material is trimmed away to result in slanted portion 25. Warm air is then blown into the panel sections to preheat. The opposed panel sections are pulled apart with suction cups. Fitments are fitted between the edges forming the slanted portion and tack sealed thereto. Next, the fitments are heat sealed to the opposed panel sections. This step is followed by a cooling bar to quench the seal.

To make the bag construction illustrated in FIG. 4, the process is similar to that illustrated in FIG. 10. The gusset material is pre-perforated, such that when it is fed into the web material, it is fed in already containing distribution apertures. After the steps of sealing to form edges of the bag, a handle is punched into the portion of the bag which will provide a carry handle 178, FIG. 4. Tear notches are then provided below the gusset by providing small cuts at opposite edges of the bag construction.

It is noted that Totani Giken Kegyo Company, Ltd. of Japan produces a pouch making machine under the designation BH-600S which can be utilized to form two panel pouches having a base gusset. Such an apparatus can be modified to provide for making pouch arrangements according to the present inventions, by including appropriate feeds for rib and trough closure arrangements and appropriate cutting and sealing equipment, including seal bars such as that described in FIGS. 8 and 9.

The arrangements of FIGS. 2 and 3 may be constructed on a form-fill-seal machine, as well, with appropriate modifications to the steps described above. The bags are made from one roll of web material. Rather than feeding in separate sections for the panel sections and gusset, a continuous piece of web material is formed by folding, into opposing panel sections with the gusset folded, or tucked, therebetween. A rib and trough closure arrangement is fed in, and sealing is done, according to the method described herein. Prior to sealing, the bags may be filled with a product.

SPECIFIC EXAMPLES AND MATERIALS

One preferred seal bar useful for making the bag and pouch arrangements described herein, was constructed out of 6061 T6 aluminum. The bar had a total longitudinal length of about 640 mm. The bar included six holes corresponding to cylindrical apertures 322, FIGS. 8 and 9. Each of the apertures were respectively spaced the following distance from one of the longitudinal ends: 35 mm, 130 mm, 225 mm, 415 mm, 510 mm, and 605 mm. The seal bar included seven through holes 326. Each of the through holes were respectively spaced the following distances from one longitudinal end of the seal bar: 20 mm, 120 mm, 220 mm, 320 mm, 420 mm, 520 mm, 620 mm, and 640 mm.

The distance between the side edges 308, 310 and an outermost part of the side edges 316, 318 of the work engaging surface 312 was about 6 mm. The distance between the outermost parts of the first and second side edges (i.e., the widest distance between the side edges) was about 18 mm. This resulted in a seal with a width of 9 mm. The distance between the closest portions of the first and second side edges 316, 318 was about 13.2 mm. The height was about 2.4 mm. The length of typical curved or rounded projections was about 16 mm. The height of the first and second side edges 316, 318 was about 5.3 mm. The radius at rounded portion 330, at a peak of one of the projections, was about 8.75 mm. The radius at rounded portion 331, between the projections, was about 6.78 mm. Other seal bars used are 14 mm wide and 10 mm wide, to result in seals with widths of 7 mm and 5 mm, respectively.

One arrangement constructed as illustrated in FIGS. 1 and 2 is for containing about one liter of material. This size pouch includes a width of about 16 mm, a length of the longer side edge of about 26.5 cm, a length of the shorter side edge of about 21 cm, and an angle at the slanted portion 25 of about 45° from horizontal. The seal length from the top edge of the bag to the point where the gusset intersects the edges is about 22 cm, for the longer side edge. The length of the non-linear inner edge at the seal between the panel sections (not including the gusset) is about 22 cm, along the longer edge. The non-linear inner edge of the seal between the panel sections (not including the gusset) for the longer edge extends about 83% of the overall length of the longer side edge. The length of the non-linear inner edge at the seal between the panel sections (not including the gusset) is about 15 cm, along the shorter edge. The non-linear inner edge of the seal between the panel sections (not including the gusset) for the shorter edge extends about 71% of the overall length of the longer side edge. The inner edge of the seal includes about 13 spaced inwardly directed projections on the longer edge, and 9 on the shorter edge. There are at least 2.5 additional spaced inwardly directed projections in the gusset region of the side edge, for both the longer and shorter edges.

One preferred size for a pouch arrangement as illustrated in FIG. 3 is for holding a volume of about 10 ounces. A 10-ounce pouch arrangement of FIG. 3 has a width of about 16.5 cm and a length of about 25.5 cm. The length of the seal between the panel sections from the top edge to the point where the gusset intersects the panel sections is about 18 cm. The length of the non-linear inner edge of the seal (not including the gusset section) is about 18 cm. The non-linear inner edge of the seal between the panel sections (not including the gusset) extends about 70% of the overall length of the side edge.

A bag construction such as that illustrated in FIG. 4 may also be a variety of dimensions, depending upon the intended use. A particularly convenient arrangement has dimensions of about 12 inches by about 18–19 inches. The length of the seal between the panel sections from the top edge to the point where the gusset intersects the panel sections is about 14 inches. The length of the non-linear inner edge of the seal (not including the gusset section) is about 14 inches. The non-linear inner edge of the seal between the panel sections (not including the gusset) extends about 73–78% of the overall length of the side edge. The inner edge of each side seal (not including the gusset) includes about 21 spaced inwardly directed projections. There are at least 8 additional inwardly directed projections in the gusset region for each of the side edges.

Bag constructions according to the present invention may be manufactured from a variety of materials. It is particularly advantageous, however, that they be constructed from relatively thin, strong material such as polyester biaxially oriented nylon linear low density polyethylene (PET/BON/LLDPE) film. Typical embodiments may be constructed wherein the first and second panel sections and gusset material comprise first and second sheets of PET/BON/LLDPE 3-ply, having a total thickness within a range of about 7 mils. Heat sealable film may be utilized, so that the means for securing the panel portions to another, securing the closure means and panel portions, and securing the base gusset in place, is by heat seals without the need for additional adhesive. The film materials are available from 2 to 5 substrates (depending on, for example, the product to be contained therein) and are laminated together in a conventional adhesive lamination process. Film materials may include metallized polyethylene, available from Flexicon, Inc., under the designation Laminated Metallized Polyester. It comprises a 48 gauge ICI #443 metallized polyethylene material metallized to 2.0–4.0% light transmission. Other film materials may include biaxially oriented nylon (available from Allied Signal), linear low density polyethylene, (available from Consolidated Thermoplastics of Chippewa Falls, Wis.), and EVOH. Oriented polypropylene may be used for the outermost material as an alternative or in addition to the materials listed above. Aluminum foil may also be used within the lamination. Further, the substrates may include coextruded layers of combinations of some of these materials. Polyester materials are preferred because they take heat and hold their form with little, if any, shrinkage.

For the arrangement illustrated in FIGS. 1 and 2, a fitment having a 9 mm opening may be used. Other fitments having a size up to 20 mm may be used. Fitments are manufactured by Menshen, a German company, and available from Waldwick Plastics, New Jersey.

For each of the embodiments of FIGS. 1–4, the embodiments include an opposite side which have an appearance that is a mirror-image of the illustrated side.

Since many embodiments of the invention can be made without departing from the spirit and scope of the invention, the invention resides in the claims hereinafter appended.

I claim:

1. A method for constructing a pouch arrangement having first and second opposed panel sections, said method including:

(a) providing first and second continuous webs of panel section material;

(b) orienting the first and second webs with respect to one another to form a continuous feed of pouch blank with front and back faces and first and second opposite side edges; and (c) heat sealing the continuous feed of pouch blank by:

(i) forming first and second side seals defining a bag construction interior between first and second panel sections; said first and second side seals each having an inner edge portion adjacent to the bag construction interior;

(A) the first side seal inner edge portion having a first section of at least nine inwardly directed projections alternating with a plurality of outwardly directed recesses;

(1) the first side seal inner edge portion first section extending a distance of at least 30% of a length of a side edge of the first panel section;

(2) each of the first section inwardly directed projections having a height of at least 0.5 mm;

(3) each of the first section inwardly directed projections having a length of at least 12 mm;

(B) the second side seal inner edge portion having a second section of at least nine inwardly directed projections alternating with a plurality of outwardly directed recesses;

(1) the second side seal inner edge portion second section extending a distance of at least 30% of a length of a side edge of the second panel section;

(2) each of the second section inwardly directed projections having a height of at least 0.5 mm;

(3) each of the second section inwardly directed projections having a length of at least 12 mm;

(d) forming a base gusset member oriented in extension between the first and second panel sections; and
(e) separating the pouch blank into individual ones of the pouch arrangements by cutting along the first and second side seals.

2. A method according to claim 1 wherein:
(a) said step of forming first and second side seals includes:
   (i) forming the first side seal inner edge portion first section to extend a distance of about 30–100% of a length of a side edge of the first panel section; and
   (ii) forming the second side seal inner edge portion second section to extend a distance of about 30–100% of a length of a side edge of the second panel section.

3. A method according to claim 1 wherein:
(a) said step of forming first and second side seals includes:
   (i) forming each of the first section inwardly directed projections to a height of no greater than 4 mm; and
   (ii) forming each of the second section inwardly directed projections to a height of no greater than 4 mm.

4. A method according to claim 1 wherein:
(a) said step) of forming first and second side seals includes:
   (i) forming each of the first section inwardly directed projections to a length of no greater than 20 mm; and
   (ii) forming each of the second section inwardly directed projections to a length of no greater than 20 mm.

5. A method according to claim 1 wherein:
(a) said step of forming first and second side seals includes:
   (i) forming the first side seal inner edge portion first section to extend a complete length of the first inner edge portion; and
   (ii) forming the second side seal inner edge portion second section to extend a complete length of the second inner edge portion.

6. A method according to claim 5 wherein:
(a) said step of forming first and second side seals includes:
   (i) forming each of the first and second section of inwardly directed projections of a uniform size and shape.

7. A method according to claim 6 wherein:
(a) said step of forming the base gusset member includes:
   (i) providing a base gusset member having a plurality of distribution apertures.

8. A method according to claim 6 further including:
(a) securing a fitment to the first and second panel sections.

9. A method according to claim 8 wherein:
(a) said step of forming the first and second panel sections further includes forming a slanted portion of the first and second panel sections slanted relative to the first and second side seals; the fitment being secured to the first and second panel sections along the slanted portion.

10. A method according to claim 6 further including:
(a) forming a transverse openable and reclosable closure arrangement extending between the first and second panel sections.

11. A method according to claim 6 wherein:
(a) said steps of forming first and second side seals includes:
   (i) forming the first side seal inner edge portion first section to include at least twelve inwardly spaced directed projections; and
   (ii) forming the second side seal inner edge portion second section to include at least twelve spaced inwardly directed projections.

12. A method according to claim 1 wherein:
(a) said step of forming a base gusset member includes orienting a continuous base gusset between first and second webs.

13. A method according to claim 12 wherein:
(a) said step of orienting the continuous base gusset between first and second webs includes orienting a perforated continuous base gusset between first and second webs.

14. A method according to claim 12 further including:
(a) orienting an openable and recloseable zipper closure between first and second webs.

15. A method according to claim 12 further including:
(a) orienting a pour spout between first and second webs.

* * * * *

UNITED STATES PATENT AND TRADEMARK OFFICE
CERTIFICATE OF CORRECTION

PATENT NO. : 6,224,528 B1
DATED : May 1, 2001
INVENTOR(S) : Gary M. Bell

It is certified that error appears in the above-identified patent and that said Letters Patent is hereby corrected as shown below:

<u>Title page,</u>
Item [56], References Cited, change "2,912,030" to -- 2,913,030 --; and
Insert -- OTHER PUBLICATIONS -- and list -- TIW, High Speed Stand Pouch Making Machine, BH-6005, Totani, August, 1984 --.

Signed and Sealed this

Thirteenth Day of August, 2002

*Attest:*

JAMES E. ROGAN
*Attesting Officer*  *Director of the United States Patent and Trademark Office*